United States Patent [19]
Bennett

[11] Patent Number: 5,573,360
[45] Date of Patent: Nov. 12, 1996

[54] PALLET LATCHING MECHANISM

[76] Inventor: Richard C. Bennett, 710 - 2 Diamond Lake Rd., Mundelein, Ill. 60060

[21] Appl. No.: 405,516

[22] Filed: Mar. 16, 1995

[51] Int. Cl.$^6$ .................................................. B60P 7/08
[52] U.S. Cl. ........................ 410/84; 410/77; 410/36
[58] Field of Search ......................... 410/69, 77, 79–81, 410/84, 36, 42; 292/163, 165

[56] References Cited

U.S. PATENT DOCUMENTS

| | | | |
|---|---|---|---|
| 1,663,245 | 3/1928 | Devereaux | 292/165 X |
| 3,107,634 | 10/1963 | Gutridge | 410/84 |
| 3,934,926 | 1/1976 | Bennett | 410/80 |
| 3,993,344 | 11/1976 | Bennett | 410/36 |
| 4,486,132 | 12/1984 | Schulz et al. | 410/81 |
| 4,542,774 | 9/1985 | Stavlo . | |
| 4,566,714 | 1/1986 | De Witt et al. . | |
| 4,642,007 | 2/1987 | Marshall et al. | 410/80 X |
| 4,662,007 | 5/1987 | Lipkin . | |
| 4,708,572 | 11/1987 | Kolker . | |
| 4,799,840 | 1/1989 | Van Gompel et al. | 410/42 |
| 5,154,556 | 10/1992 | Wappel | 410/36 |

*Primary Examiner*—Karen B. Merritt
*Assistant Examiner*—Stephen Gordon
*Attorney, Agent, or Firm*—Emrich & Dithmar

[57] ABSTRACT

A truck bed is divided into a plurality of bays, each bay being defined by a pair of dividers. In each bay is a pallet. The latching mechanism comprises a bolt which is spring-loaded outwardly, through the keeper hole in the adjacent divider. A triangular link is rotatably mounted at a fixed pivot point. The bolt is coupled to a second point on the link. An actuator is movable substantially vertically and is attached to a third point on the link. When the fork of a lift truck engages the actuator and raises it, the link is caused to rotate about the fixed pivot point, to withdraw the bolt and thereby unlatch the latching mechanism.

8 Claims, 4 Drawing Sheets

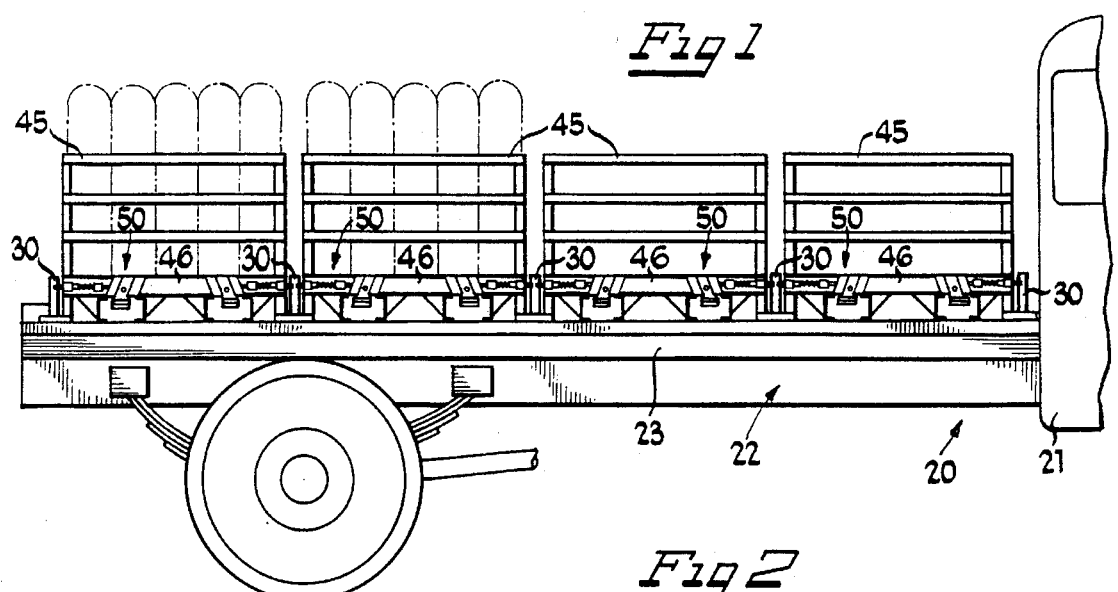
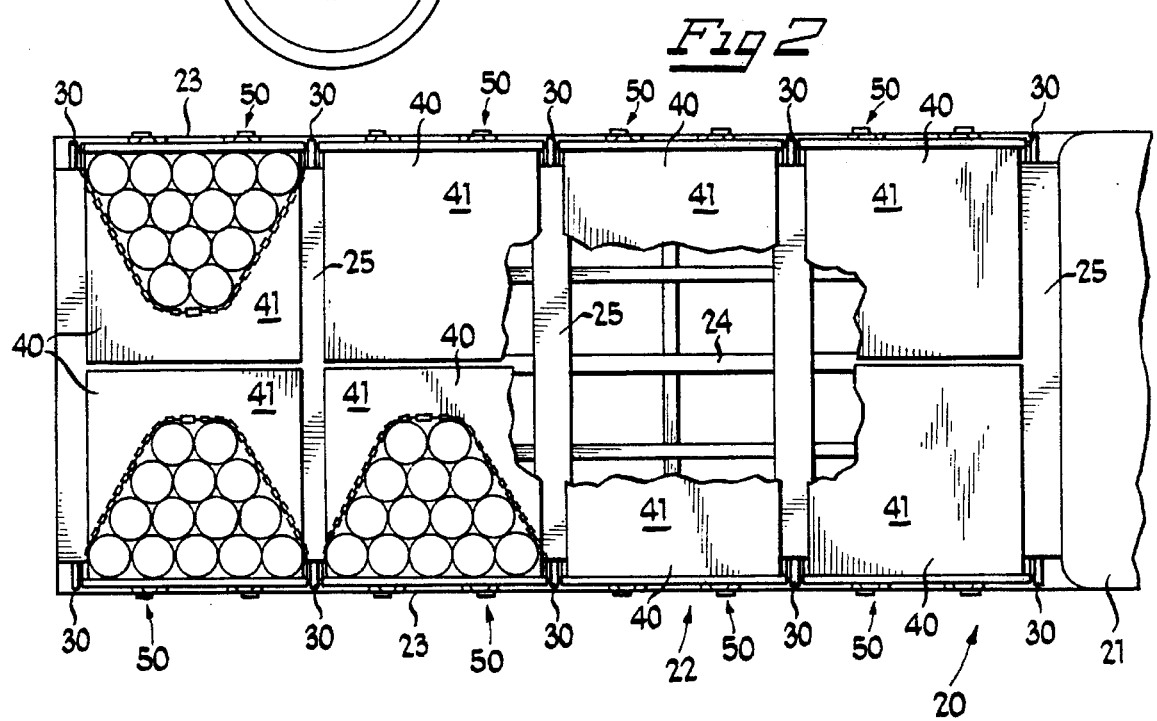
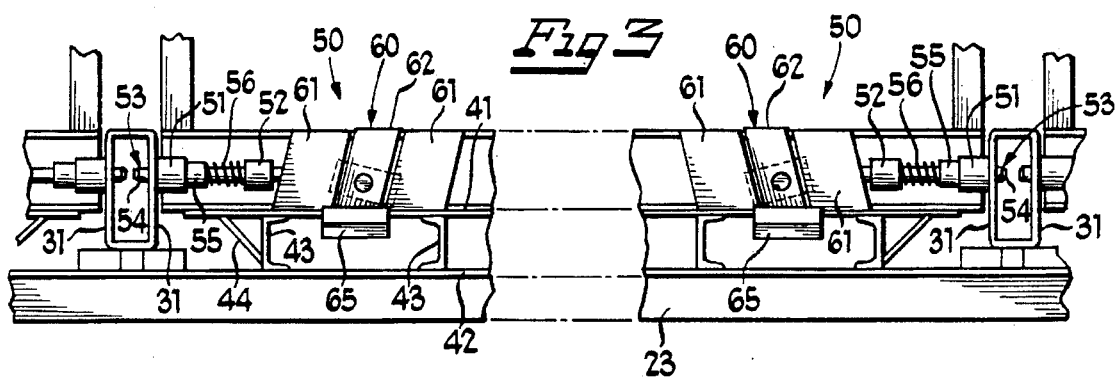

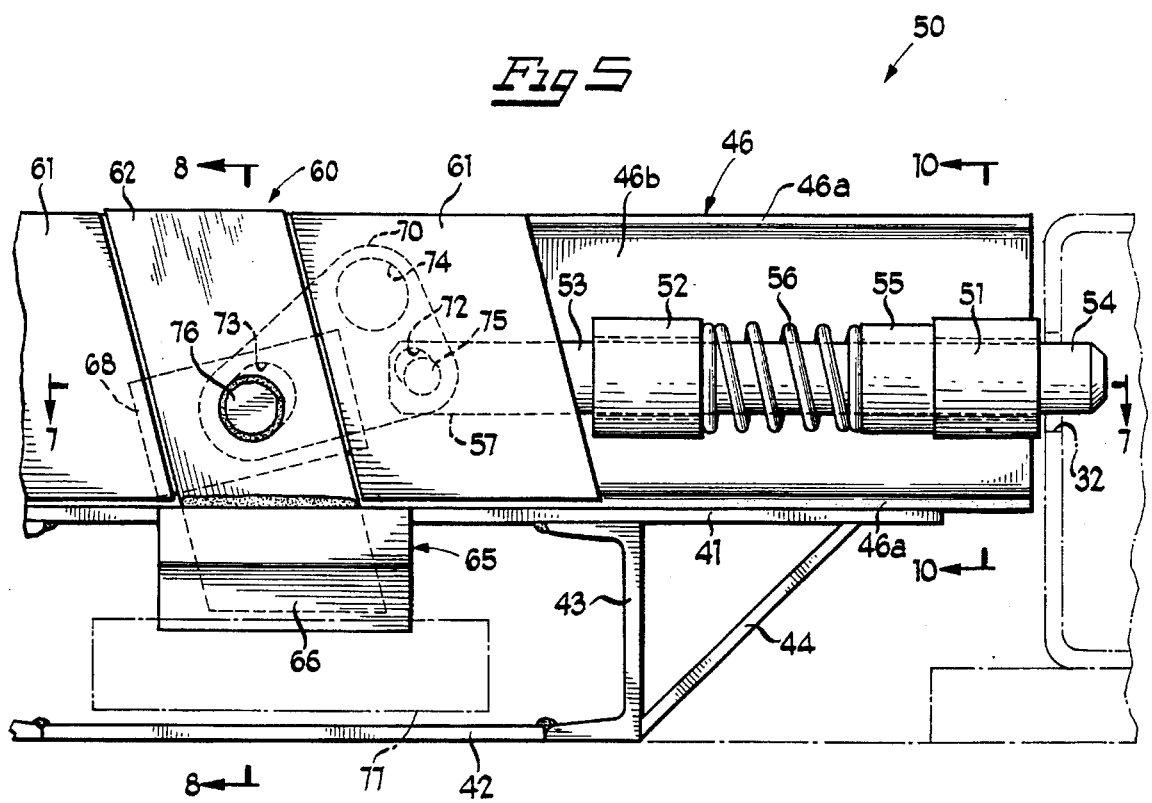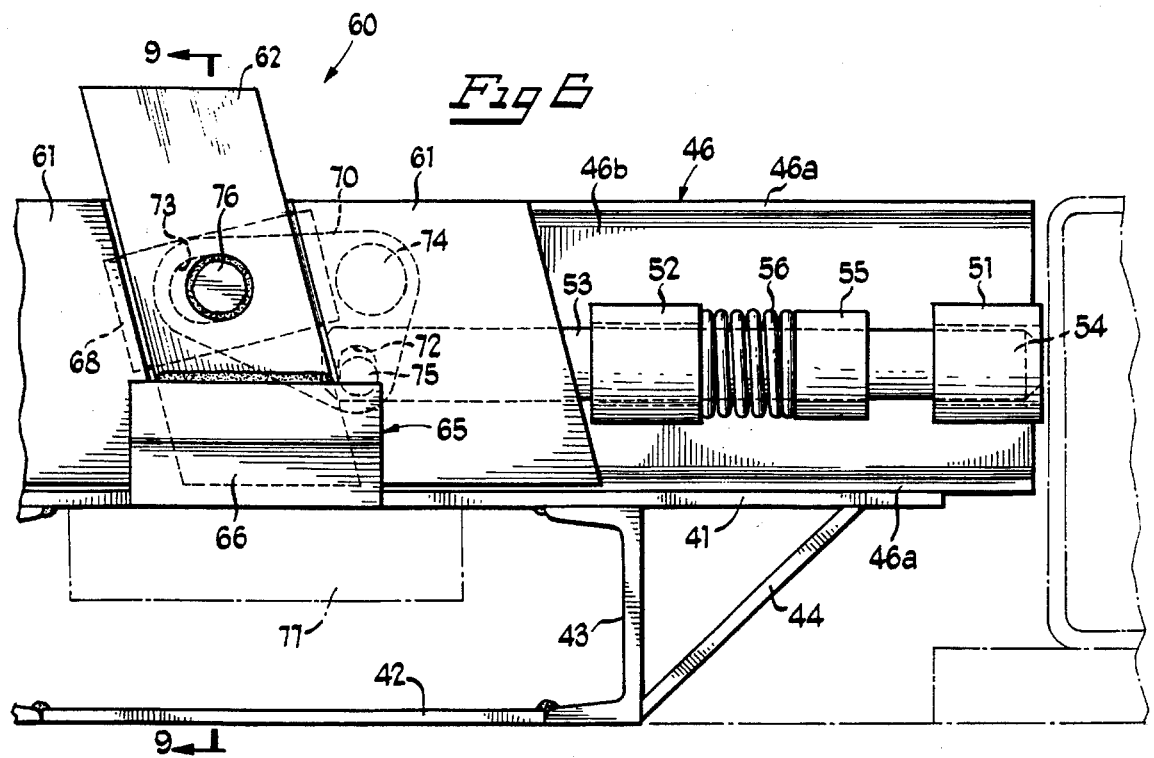

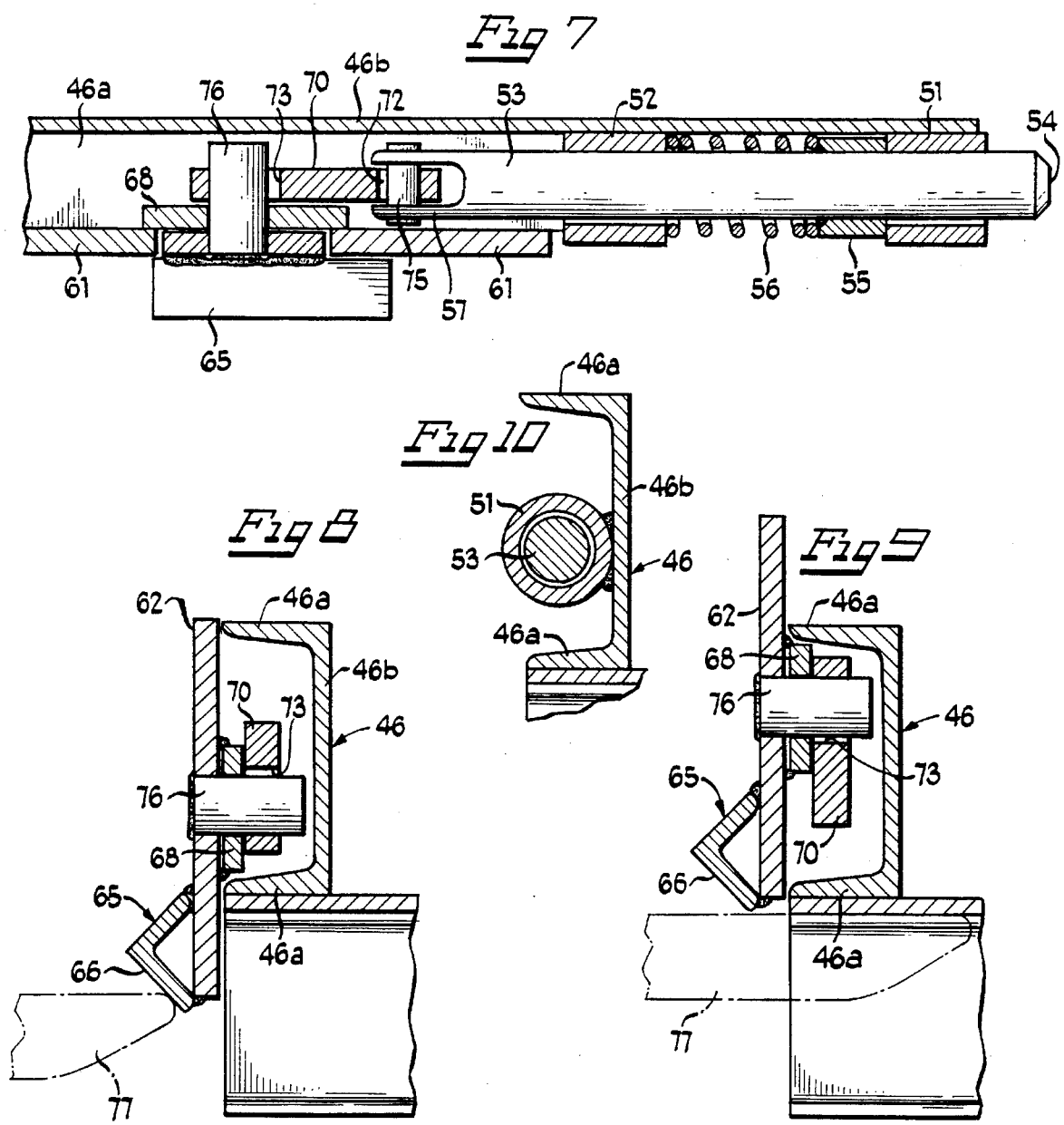

5,573,360

PALLET LATCHING MECHANISM

BACKGROUND OF THE INVENTION

The present invention relates to palletized systems. Such a system includes a number of pallets removably positioned on a bed, such as that of a vehicle. A forklift truck places the pallets on the bed and removes the pallets therefrom.

U.S. Pat. No. 3,934,926 issued to the inventor hereof discloses a latching mechanism by which each pallet is latched onto the bed automatically by the forklift truck as it positions the pallet on the bed and automatically unlatches the mechanism when it removes the pallet. The patented latching mechanism includes a bolt which is horizontally movable between latching and unlatching positions. An actuator associated with the bolt is engaged by the lift truck's fork to cause the automatic unlatching described above.

The patented latching mechanism has been effectively used for a number of years. However, the link by which the bolt is coupled to the actuator imparted a non-horizontal component to the bolt, causing the bolt to tend to bind.

SUMMARY OF THE INVENTION

It is therefore an important object of the present invention to provide an improved pallet latching mechanism.

Another object is to provide a pallet latching mechanism in which the non-horizontal component of the latching bolt is reduced.

Another object is to provide a pallet latching system utilizing a horizontally movable bolt in which the tendency to bind is reduced.

Another object is to provide an improved latching mechanism which delivers greater mechanical advantage so that less force is required to be exerted by the forks of the lift truck to unlatch the pallets.

In summary, there is provided a latching mechanism to retain a pallet on a support having a keeper, comprising a bolt movable substantially horizontally between a latching position in the keeper and an unlatching position outside the keeper, a spring for urging the bolt to the latching position thereof, an actuator movable substantially upwardly and substantially downwardly, a link mounted for rotation about a fixed point, first coupling means for coupling the bolt to the link, second coupling means for coupling the actuator to the link, and engaging means on the actuator for being engaged by the fork of a lift truck for moving the actuator substantially upwardly to move the bolt to the unlatching position thereof.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

FIG. 1 depicts an elevational view of a portion of a vehicle carrying a plurality of pallets, each with a pallet latching mechanism incorporating the features of the present invention;

FIG. 2 is a plan view of FIG. 1;

FIG. 3 is an enlarged, fragmentary view of the bottom of one of the pallets, the associated vehicle bed and the latching mechanisms;

FIG. 5 is an elevational view of one of the latching mechanisms in its latching position;

FIG. 6 is an elevational view of one of the latching mechanisms in its unlatching position;

FIG. 7 is a view in section taken along the lines 7—7 of FIG. 5;

FIG. 8 is a-view in section taken along the lines 8—8 of FIG. 5;

FIG. 9 is a view in section taken along the lines 9—9 of FIG. 6; and

FIG. 10 is a view in section taken along the lines 10—10 of FIG. 5.

DETAILED DESCRIPTION OF THE PREFERRED EMBODIMENT

Figure 4:
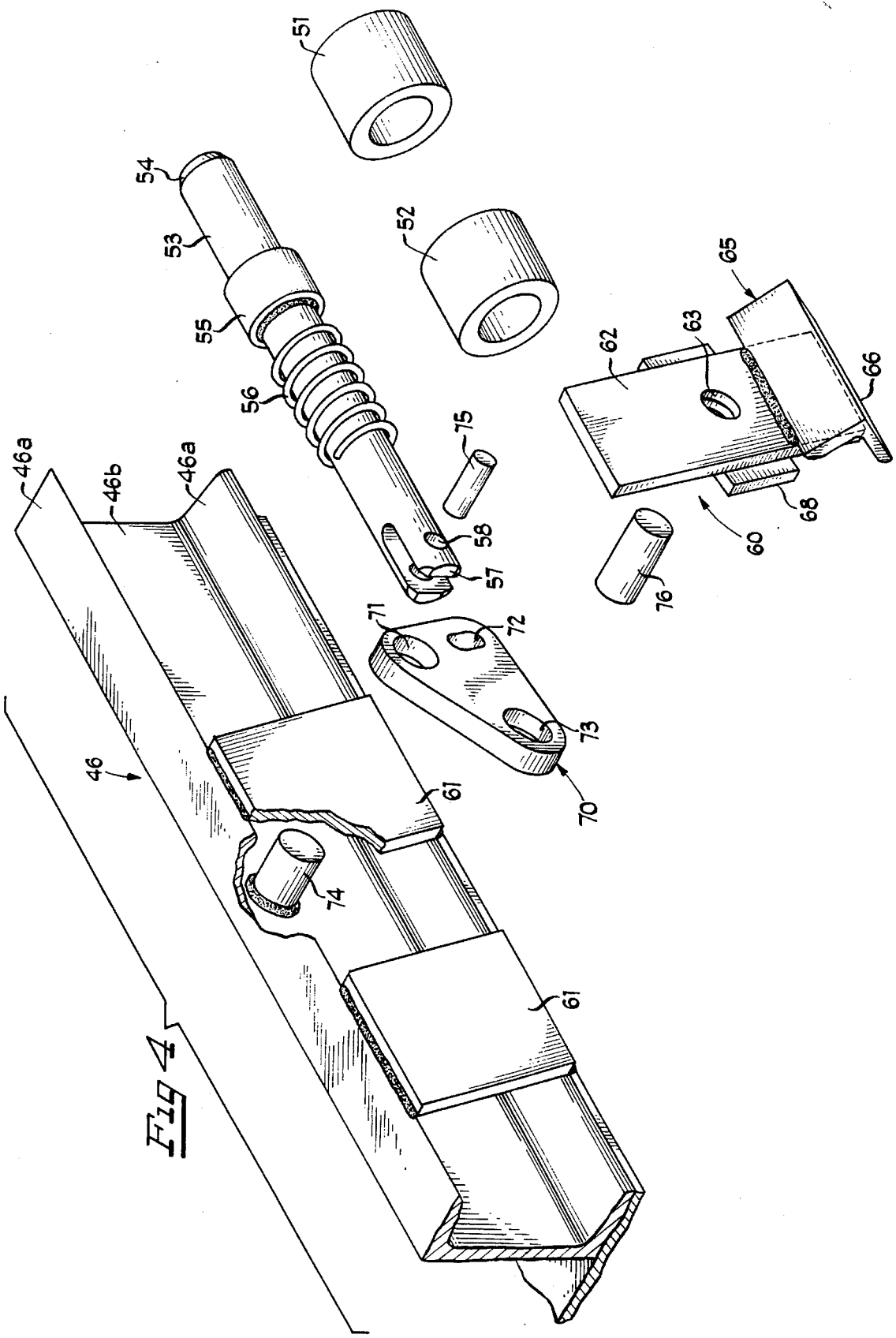
FIG. 4 is an exploded view of one of the latching mechanisms.

Turning now to the drawings, and more particularly to FIG. 1 thereof, there is illustrated a transporting system comprising a vehicle 20, which vehicle includes a cab 21 and a trailer 22. The trailer may be of basically standard construction. The trailer includes a load-supporting bed made up, in part, of a pair of longitudinally extending side beams 23, a center beam 24 and cross beams 25. Mounted on each side beam 23 are five dividers 30, effectively dividing the bed into eight bays, one bay between each pair of adjacent dividers. Of course, the number eight is exemplary. Each divider 30 includes a pair of spaced-apart, substantially parallel side walls 31. In each sidewall 31 is a keeper 32 (FIG. 5) which, in the form illustrated, is simply a hole. The transporting system further comprises a plurality of rectangular pallets 40 corresponding in number to the number of bays.

Each pallet 40 includes an upper plate 41. Referring to FIG. 3, each pallet also includes a number of coplanar slats 42 defining a lower member. A plurality of transversely extending struts 43 is welded to the upper plate of 41 and to slats 42. Two inclined side walls 44 are also welded to upper plate 41 and slats 42. Each pallet 40 may also have an upstanding fence 45. Fence 45 includes several cross members, the bottom one of which is channel shaped and is marked 46. Member 46 includes flanges 46a and a web 46b.

Associated with each pallet 40 are two latching mechanisms 50, one on each side. Each latching mechanism includes a pair of longitudinally spaced-apart bushings 51 and 52 welded to web 46b. Reciprocally carried by bushings 51 and 52 is a bolt 53 having an outer end 54 which is rounded in the embodiment shown. The other end of bolt 53 has a U-shaped or bifurcated member 57 welded to it. Bolt 53 is movable between a latching position depicted in FIG. 5 and an unlatching position, when it is retracted, as depicted in FIG. 6. A sleeve 55 is fixedly mounted on bolt 53 near end 54. A spring 56 in compression is carried by bolt 53 between bushing 52 and sleeve 55, thereby urging bolt 53 outwardly to its latching position.

Latching mechanism 50 also includes an actuator 60, which actuator includes a pair of spaced-apart rails 61 welded to flanges 46a and arranged at a slight incline so that the guideway defined by rails 61 is also inclined slightly. A carriage plate 62 has a thickness approximately the same thickness as the thickness of each rail. Plate 62 has a hole 63 therein. Plate 62 has a width slightly less than the distance between rails 61 and is slidably disposed therebetween. A metal bar 68 is welded to the backside of plate 62 and is located behind rails 61, which retains plate 62 between rails 61. Alternatively, in place of bar 68, the sides of carriage plate 62 may be beveled so that its front surface is narrower than the rear surface and rails 61 may also be beveled in the reverse elevation, whereby plate 62, although slidably movable, is constrained between rails 61 and flanges 46a to which they are welded.

Welded to the lower end of carriage plate 62 is an elongated diverter member 65 being V-shaped in transverse cross section. The lower surface 66 of diverter 65 constitutes a diverting surface to guide fork 77 of a lift truck to a position beneath carriage plate 62.

There is also provided a link 70, which, in the embodiment depicted, is a plate substantially triangular in shape with rounded corners, having a hole 71 near one corner, and slots 72 and 73 respectively, near the other corners. Preferably link 70 comprises a laminar construction to improve its strength. In an actual embodiment, link 70 had four laminae welded together. Welded to the web 46b of cross member 46 is a pin 74. Pin 74 has a diameter slightly smaller than the diameter of hole 71 and extends therethrough. Pin 74 therefore provides a center of rotation of link 70. Link 70 is constrained between one of rails 61 and web 46b of cross member 46.

Link 70 is disposed between the legs of member 57 of bolt 53. A pin 75 extends through holes 58 in member 57 and through slot 72. The diameter of pin 75 is slightly less than the width of slot 72 so as to move freely therein. Accordingly, as link 70 rotates about pin 74, pin 75 will move within slot 72. A pin 76 has a diameter to be press fit into hole 63 and to be attached thereto as by welding. The diameter of pin 76 is slightly less than the width of slot 73 and extends therethrough. Accordingly, when plate 62 is slid upwardly, pin 76 rotates link 70 clockwise about pin 74 as pin 76 moves within slot 73. At the same time, link 70 pulls pin 75 to the left, as viewed in FIG. 6, to move bolt 53 toward the left. When plate 62 is released, spring 56 urges bolt 53 to the right, whereby pin 75 causes link 70 to rotate counterclockwise as pin 75 moves within slot 72. Link 70 transmits such motion to pin 76 causing plate 62 to move downwardly as pin 76 moves within slot 73.

In a preferred embodiment, the distance between slots 72 and 73 is about twice the distance between holes 71 and slot 72, whereby the force delivered to bolt 53 is about twice the force applied to actuator 60. Thus, for example, if each fork of the lift truck exerts 100 pounds of lifting force, 200 pounds of force to withdraw bolt 53 is provided. If more force is required, the distance between slots 72 and 73 could be increased or the distance between hole 71 and slot 72 could be decreased.

In FIG. 5, latching mechanism 50 is depicted in its latching position. In other words, end 54 protrudes outwardly and through keeper 32 in one side wall 31 of adjacent divider 30. The action of spring 56 urges sleeve 55 outwardly with respect to bushing 51, thereby biasing bolt 53 to such latching position.

To remove a pallet from vehicle 20, forks 77 of a lift truck are aligned by the operator with the spaces between the bottom of the diverter 65 and slats 42. The operator drives forwardly so that forks 77 strike diverter 65. As he drives forwardly, plates 62 move up. Or, if each fork enters the space between diverters 65 and slats 42, then forks 77 are raised to move plate 62 upwardly.

As it is raised, plate 62 moves slightly toward the left. The other plate (on the left-hand side of the pallet) will move slightly toward the right. Link 70 is caused to rotate clockwise, as depicted in FIG. 6, to retract bolt 53 along bushings 51 and 52. This action is performed against the biasing furnished by spring 56. Bolt 53 is, therefore, placed in its unlatching position, that is, it is withdrawn from keeper 32 in divider 30. The other fork (not shown) of the lift truck will perform in substantially identical fashion in respect to the latching mechanism on the other side of pallet 40. Pallet 40 may then be taken off the vehicle and transported by the lift truck to its intended destination.

The use of a link 70 that is rotatable about a point fixed with respect to the pallet means that pin 75 maintains the same vertical elevations even though link 70 is rotating. The result is that bolt 53 remains substantially horizontal at all times. A minimal vertical component is added to the bolt. Minimization of the vertical component reduces the tendency of bolt 53 to bind in bushings 51 and 52. Furthermore, such construction gives a substantial mechanical advantage.

It is believed that the invention, its mode of construction and assembly, and many of its advantages should be readily understood from the foregoing without further description, and it should also be manifest that, while the preferred embodiment of the invention has been shown and described for illustrative purposes, structural details are, nevertheless, capable of wide variation within the per view of the invention as described in the appended claims.

What is claimed is:

1. A latching mechanism to retain a pallet on a support having a keeper, comprising a bolt movable substantially horizontally between a latching position in the keeper and an unlatching position outside the keeper, spring means for urging said bolt to the latching position thereof, an actuator movable substantially upwardly and substantially downwardly, a link mounted for rotation about a fixed point, first coupling means including a slot in said link and a pin passing therethrough and attached to said bolt for coupling said bolt to said link, second coupling means for coupling said actuator to said link, and engaging means on said actuator for being engaged by the fork of a lift truck for moving said actuator substantially upwardly to move said bolt to the unlatching position thereof.

2. The latching mechanism set forth in claim 1, wherein said bolt has a bifurcated end, said bifurcated end receiving said link and said pin passing through said bifurcated end and said link.

3. The latching mechanism set forth in claim 1, wherein said actuator is slightly inclined.

4. The latching mechanism set forth in claim 1, wherein said engaging means has an inclined surface.

5. The latching mechanism set forth in claim 1, wherein said link includes a plate of generally triangular shape having three corners, said fixed point being adjacent to one of said corners, said first coupling means being coupled adjacent to a second of said corners and said second coupling means being coupled adjacent to a third of said corners.

6. A latching mechanism to retain a pallet on a support having a keeper, comprising a bolt movable substantially horizontally between a latching position in the keeper and an unlatching position outside the keeper, spring means for urging said bolt to the latching position thereof, an actuator movable substantially upwardly and substantially downwardly, a link mounted for rotation about a fixed point, first coupling means for coupling said bolt to said link, second coupling means including a slot in said link and a pin attached to said actuator and extending through said slot for coupling said actuator to said link, and engaging means on said actuator for being engaged by the fork of a lift truck for moving said actuator substantially upwardly to move said bolt to the unlatching position thereof.

7. A latching mechanism to retain a pallet on a support having a keeper, comprising a bolt movable substantially horizontally between a latching position in the keeper and an unlatching position outside the keeper, spring means for urging said bolt to the latching position thereof, an actuator including a pair of spaced rails and a carriage plate slidably disposed therebetween and movable substantially upwardly and substantially downwardly, a link mounted for rotation about a fixed point, first coupling means for coupling said bolt to said link, second coupling means for coupling said actuator to said link, and engaging means on said actuator for being engaged by the fork of a lift truck for moving said actuator substantially upwardly to move said bolt to the unlatching position thereof.

8. The latching mechanism set forth in claim 7, wherein the pallet has a frame, said rails being attached to said frame, and further comprising a bar attached to said carriage plate and located behind said rails, whereby said plate is retained between said rails.

* * * * *